(12) United States Patent
Newman et al.

(10) Patent No.: US 7,975,714 B2
(45) Date of Patent: Jul. 12, 2011

(54) BURST DISK ASSEMBLY

(75) Inventors: Shmuel Dovid Newman, Redondo Beach, CA (US); Jeff Brown, North Logan, UT (US)

(73) Assignee: DAAS IP Management, LLC, Gardena, CA (US)

( * ) Notice: Subject to any disclaimer, the term of this patent is extended or adjusted under 35 U.S.C. 154(b) by 0 days.

(21) Appl. No.: 12/776,243

(22) Filed: May 7, 2010

(65) Prior Publication Data
US 2010/0282331 A1   Nov. 11, 2010

Related U.S. Application Data

(60) Provisional application No. 61/215,753, filed on May 8, 2009.

(51) Int. Cl.
*F16K 17/40* (2006.01)

(52) U.S. Cl. ............. 137/68.23; 137/68.19; 137/315.11; 220/89.2

(58) Field of Classification Search ............... 137/68.11, 137/68.19, 68.23, 68.24, 68.25, 315.11; 220/89.2
See application file for complete search history.

(56) References Cited

U.S. PATENT DOCUMENTS

| | | | | |
|---|---|---|---|---|
| 1,606,831 A | * | 11/1926 | Ford | 220/89.2 |
| 1,631,372 A | * | 6/1927 | Harris | 137/68.23 |
| 1,951,926 A | * | 3/1934 | Davidson | 220/89.2 |
| 2,133,461 A | * | 10/1938 | McAbee | 220/89.2 |
| 2,526,794 A | * | 10/1950 | Andrews | 220/89.2 |
| 2,552,110 A | * | 5/1951 | Otis et al. | 220/89.2 |
| 2,811,573 A | * | 10/1957 | Williams | 220/89.2 |
| 3,404,698 A | * | 10/1968 | Rouse | 137/68.23 |
| 4,146,047 A | * | 3/1979 | Wood et al. | 220/89.2 |
| 4,219,040 A | | 8/1980 | Fallon et al. | |
| 4,590,957 A | | 5/1986 | McFarlane | |

(Continued)

FOREIGN PATENT DOCUMENTS

JP    2005282638 A2    10/2005

OTHER PUBLICATIONS

KIPO International Search Report (ISR) and Written Opinion in co-pending application PCT/US2010/033664.

*Primary Examiner* — John Rivell
(74) *Attorney, Agent, or Firm* — Lance M. Pritikin; Bruce A. Jagger

(57) ABSTRACT

A low-profile burst disk assembly for safely venting excess pressure from a pressurized fluid system by way of a tortuous fluid flow path. A burst disk plug includes a male thread and is thereby adapted to thread into the body of a pressurizable chamber. The burst disk plug further includes a fluid receiving port placed in fluid communication between the burst disk and one or more bleed channels open to ambient pressure. The one or more bleed channels generally run axially through the burst disk plug, either intersecting or bypassing the male thread. Embodiments with a plurality of bleed channels generally include a distribution manifold positioned in fluid communication between the fluid receiving port and the one or more bleed channels to ensure an even distribution of venting pressure among the bleed channels. A flange surface further deflects pressurized fluid as it escapes from the bleed channels toward the ambient environment, thereby dispersing the resulting thrust in multiple directions and minimizing the effective force exerted on the body of the pressurized fluid system.

20 Claims, 3 Drawing Sheets

U.S. PATENT DOCUMENTS

| | | |
|---|---|---|
| 5,076,313 A | 12/1991 | Bottum, Jr. et al. |
| 5,632,505 A * | 5/1997 | Saccone et al. ............ 137/68.23 |
| 5,832,947 A * | 11/1998 | Niemczyk .................. 137/68.23 |
| 7,051,751 B2 | 5/2006 | Carroll |
| 2002/0017319 A1 | 2/2002 | Hintzman et al. |
| 2005/0121073 A1 | 6/2005 | Carroll |
| 2005/0211940 A1 | 9/2005 | Takeda et al. |
| 2008/0178938 A1* | 7/2008 | Stokes et al. ............... 137/68.23 |
| 2010/0282330 A1* | 11/2010 | Luther et al. ............... 137/68.11 |

\* cited by examiner

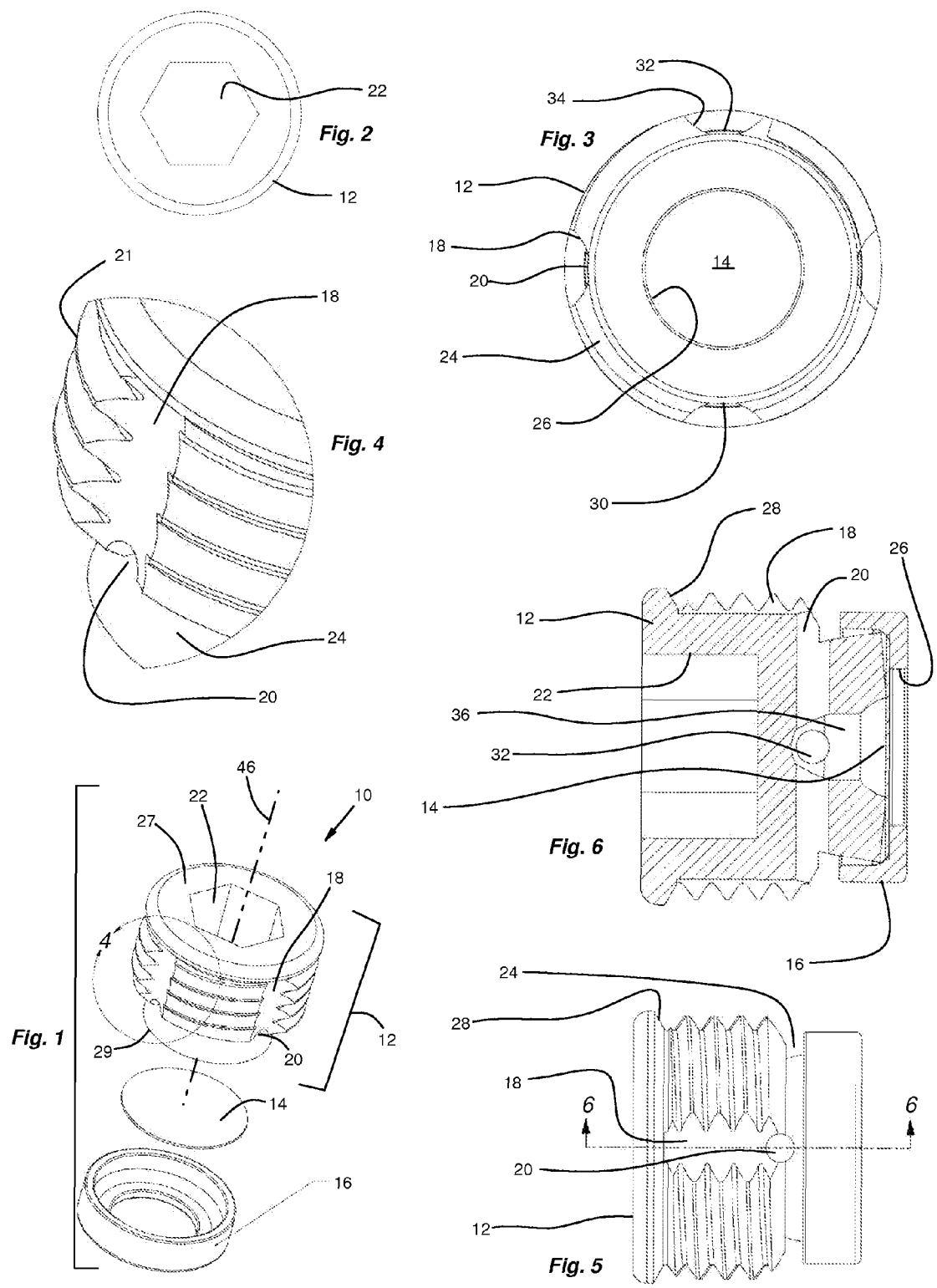

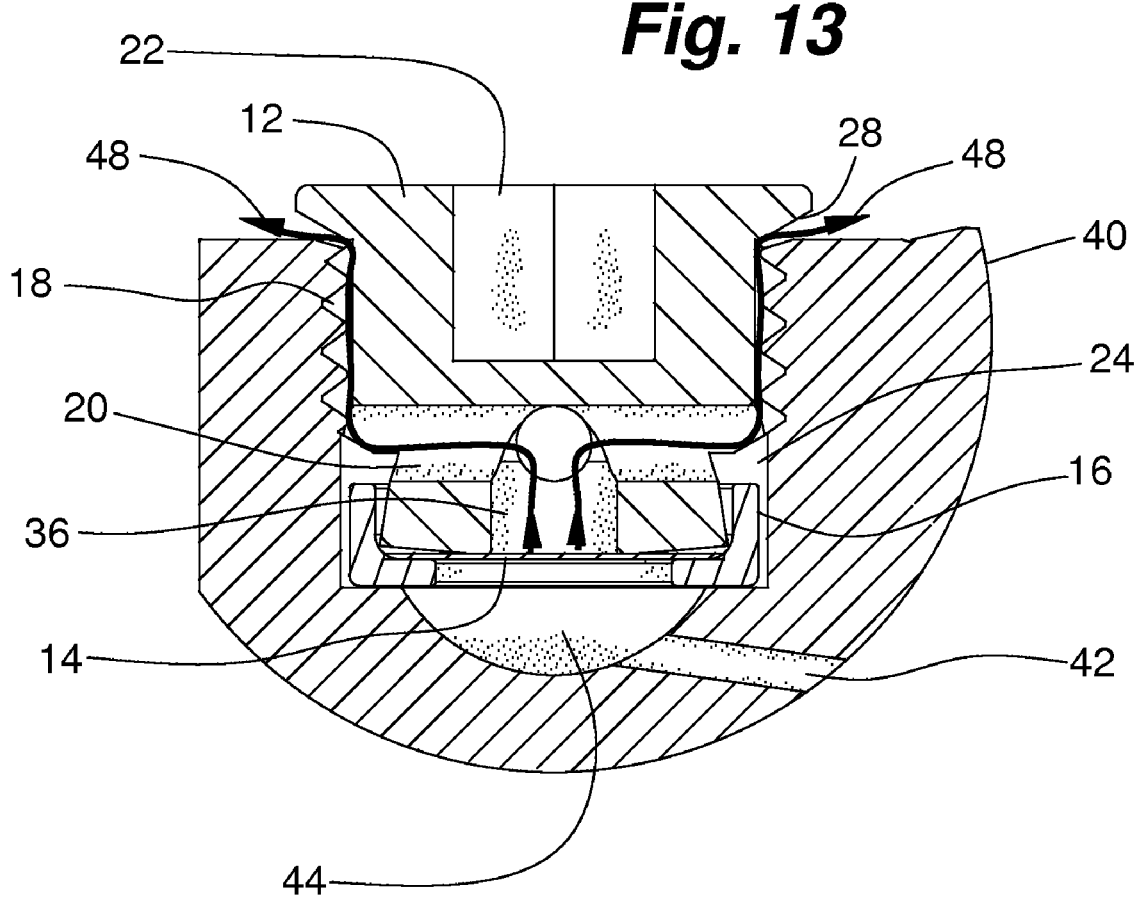

BURST DISK ASSEMBLY

RELATED APPLICATIONS

This application claims the benefit of U.S. Provisional Application No. 61/215,753, filed on May 8, 2009, the content of which is incorporated by this reference in its entirety for all purposes as if fully set forth herein.

TECHNICAL FIELD OF THE INVENTION

The present invention relates generally to the field of pressure relief systems. More particularly, the invention concerns an improved burst assembly which relieves overpressurized fluid by way of a tortuous flow path.

BACKGROUND OF THE INVENTION

Burst disks are employed in many pressurized fluid systems to prevent dangerous over-pressurization conditions from existing in the systems. In the event a pressurizable chamber to which a burst disk assembly is mounted becomes overpressurized, safety concerns require that it be immediately vented to reduce the pressure. This prevents the chamber from exploding. Such venting of high pressure fluid must be accomplished in a safe manner. The burst disks are typically the weakest structural components in the system. This is so that the likely pressure-induced rupture location in the system is limited to the burst disk, and the burst disk is generally positioned where people and surroundings are not likely to be injured by the rupturing of the burst disk. People and equipment must be protected from the jet of high pressure fluid, and from fragments of the burst disk. Also, the reaction force of the escaping jet of fluid must be prevented from turning the container it is escaping from into an uncontrolled missile.

Conventional pressure relief devices that include burst disks are generally designed with two or four vent holes drilled into a burst disk mounting plug which is secured to the pressurized fluid system at an attachment point. See, for example, U.S. Pat. No. 4,590,957, the disclosure of which is hereby incorporated by reference as if fully set forth herein. There is typically a portion of the mounting plug that remains exposed to the ambient environment at a distance from the attachment point. That distant exposed portion is generally referred to herein as the "head" of the mounting plug. The vent holes are generally formed by cross-drilling bores in a radial direction generally between the head and the attachment point of the mounting plug. The cross-drilled vent holes are drilled to intersect a central axially extending bore. The cross-drilled vent holes and the axial bore tend to weaken the attachment of the body of the mounting plug to the head. If the head breaks off in a disk rupture episode it becomes a missile.

Putting the radially extending vent holes near the bottom of the threaded plug, below the threads, ensures that the part of the body of the plug that is weakened by cross-drilling and boring will not break off and become a loose missile. Safety is thus enhanced. Burst disks are provided for purposes of safety, to control as much as possible an inherently unsafe situation where an over-pressurized condition exists in a pressurized fluid system. Improvements in burst disks that enhance safety are eagerly sought by those skilled in this art.

Pressure relief devices with a burst disks and a tortuous fluid flow path are known in the art. See, for example, U.S. Pat. No. 4,219,040, the disclosure of which is hereby incorporated by reference as if fully set forth herein. However, the plurality of vent ports formed in the cap can severely weaken the cap, which again presents the potential for portions of the assembly to break loose and become one or more projectiles in a disk rupture episode.

Hand-held pressurized fluid systems, such as those used with devices like paintball markers, present an additional safety concern with respect to overpressure venting. U.S. Pat. No. 7,051,751, the disclosure of which is hereby incorporated by reference as if fully set forth herein, illustrates in FIGS. 2 and 4 an example of a device in which the full force of the escaping fluid would be oriented in a single direction. Venting all of the pressure in the same direction generates a thrust which can turn the entire system into a projectile. For this reason, a preferable design is generally one that disperses the force of the escaping fluid in multiple directions, particularly directions which in combination result in near-zero net thrust on the hand-held device.

There exists a need for an inexpensive burst disk assembly with a low profile that significantly reduces the risk of structural failure and escaping burst disk fragments upon the rupturing of the burst disk. Just as important for some applications, the same burst disk assembly should disperse escaping pressurized fluid in multiple directions so as to avoid unidirectional thrust that can turn the pressurized system into a missile.

SUMMARY OF THE INVENTION

By way of summary, the embodiments concern a burst disk assembly for use in a pressurized fluid system for venting pressurized fluid from the system in the event that the pressure of the fluid exceeds a predetermined amount. The burst disk assembly generally comprises a burst disk plug, a burst disk, a burst disk retainer, and a pressure venting system.

The burst disk plug has a major axis and an approximately cylindrical surface generally concentric with the major axis. A male thread is formed on the approximately cylindrical surface. One or more bleed channels extend through the burst disk plug generally axially, that is, generally parallel to the major axis. Depending on the particular embodiment, the one or more bleed channels may or may not intersect the male thread. The one or more bleed channels are open to an ambient environment. The burst disk plug also has an interior end and an exterior end. A burst disk is rupturably retained at about the interior end of the burst disk plug, generally by way of the burst disk retainer.

The pressure venting system includes a fluid receiving port within the burst disk plug. The fluid receiving port is relieved at generally the interior end, placing it in fluid receiving position with the burst disk and in fluid communication with the one or more bleed channels. The fluid receiving port of certain embodiments includes a chamfer or a fillet at generally the interior end.

The burst disk plug of some embodiments may include a pressure distribution manifold disposed in fluid communication between the fluid receiving port and the one or more bleed channels. The distribution manifold extends at least partially circumferentially of the burst disk plug, approximately adjacent the interior end.

Depending upon the particular embodiment, the fluid receiving port defines one or multiple tortuous fluid flow passages leading to fluid communication with the one or more bleed channels. For example, in certain embodiments, the fluid receiving port includes one or more generally radially extending bores in fluid communication between the interior end and the distribution manifold. In such embodiments, the distribution manifold is typically in fluid communication between the generally radially extending bores and the one or more bleed channels.

In certain embodiments, the pressure venting system further includes a flange surface approximately adjacent the exterior end and extending approximately radially of the major axis. The flange surface is positioned adjacent the one or more bleed channels to deflect fluid flowing therefrom.

Embodiments typically comprise a burst disk retainer adapted to receivingly engage the burst disk and a portion of the burst disk plug so as to retainingly secure the burst disk at approximately the interior end of the burst disk plug. The burst disk retainer generally includes a port forming a fluid communication pathway between the burst disk and the pressurized fluid in the system. In particular embodiments, the burst disk plug also includes a socket at approximately the exterior end, typically a hexagonal socket.

Embodiments find particular application, for example, in regulators that are used in association with paint ball guns or markers where the lightweight paint ball assembly is held by the user. Due to the proximity of the burst disk assembly to the human body in such applications, any burst disk fragments present a serious safety hazard. This risk is eliminated by embodiments of the burst disk assembly of the present invention. Gas in a paint ball gun system at pressures of, for example, 4,000 to 5,000 pounds per square inch presents a serious risk of explosion, and it must be vented immediately. Embodiments provide the necessary venting safely and effectively.

The detailed description of embodiments of the burst disk assembly is intended to serve merely as examples, and is in no way intended to limit the scope of the appended claims to these described embodiments. Accordingly, modifications to the embodiments described are possible, and it should be clearly understood that the invention may be practiced in many different ways than the embodiments specifically described below, and still remain within the scope of the claims.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a diagrammatic exploded perspective view of an embodiment of a burst disk assembly;

FIG. 2 is diagrammatic top view of a burst disk plug;

FIG. 3 is a diagrammatic bottom view of a burst disk assembly;

FIG. 4 is a diagrammatic enlarged view of detail 4 in FIG. 1;

FIG. 5 is a diagrammatic side view of a burst disk assembly;

FIG. 6 is a diagrammatic cross-sectional view taken along line 6-6 in FIG. 5;

FIG. 13 is a diagrammatic partial section view depicting an embodiment threaded into a body of a pressurized fluid system.

Figure 7:
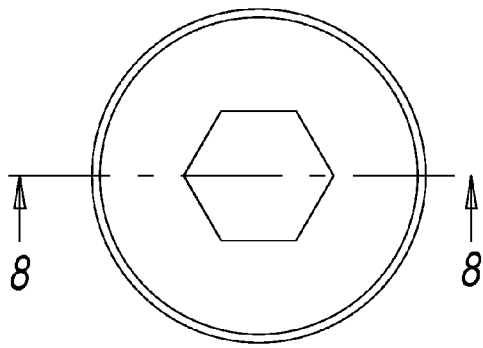
FIG. 7 is diagrammatic top view of a further embodiment of a burst disk plug.
Figure 10:
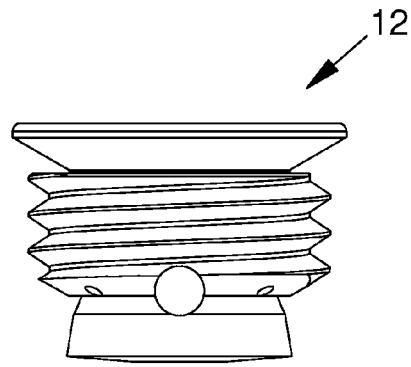
FIG. 10 is a diagrammatic side view of a further embodiment of a burst disk plug.

While the invention is susceptible to various modifications and alternative forms, specific embodiments thereof are shown by way of example in the drawings and may herein be described in detail. The drawings may not be to scale. It should be understood, however, that the drawings and the detailed description thereto are not intended to limit the invention to the particular for disclosed, but to the contrary, the intention is to cover all modifications.

DETAILED DESCRIPTION OF THE INVENTION

In the embodiments chosen for purposes of illustration (see, for example FIGS. 1-6), a burst disk assembly 10 includes burst disk plug 12, burst disk 14, and burst disk retainer 16. Burst disk plug 12 has a major axis 46, an exterior end 27, an interior end 29, a male thread 21, and is adapted to be threadably installed into a threaded port in a body 40 of a pressurizable chamber 44 (see, for example, FIG. 13) with burst disk 14 exposed to any fluid that is within the interior of pressurizable chamber 44. Burst disk 14 is adapted to rupture when exposed to a predetermined pressure. Such predetermined pressure may be from, for example, 10 to as much as 5,000 or more pounds per square inch, depending on the application. As shown in FIG. 13, pressurizable chamber 44 may be in fluid communication with a larger pressurizable source through, for example, a high pressure line 42.

Returning to FIG. 13 for illustration, burst disk assembly 10 exhibits a very low profile when fully threaded into a threaded port. If an apparatus containing burst disk assembly 10 is subject to substantial abuse, the low profile tends to prevent the assembly from receiving a strong blow that might fracture, loosen or dislodge it from the threaded port in which it is installed. Also, if the apparatus with burst disk assembly 10 in it is to be handled by people, the low profile makes the apparatus easier to handle.

Figure 8:
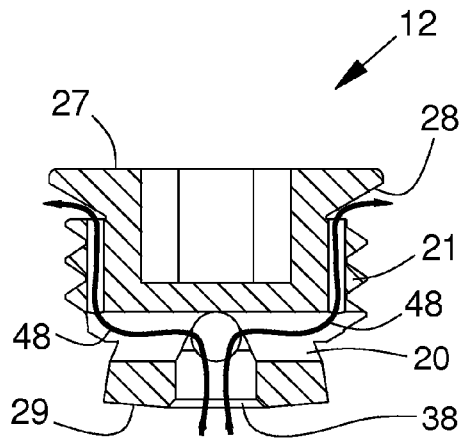
FIG. 8 is a diagrammatic cross-sectional view taken along line 8-8 in FIG. 7.
Figure 11:
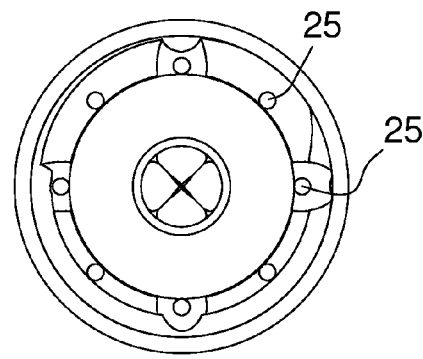
FIG. 11 is a diagrammatic bottom view of a further embodiment of a burst disk plug.
Figure 9:
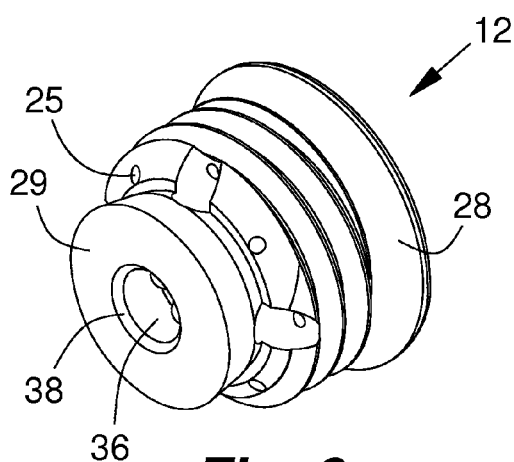
FIG. 9 is a diagrammatic perspective view of a further embodiment of a burst disk plug.
Figure 12:
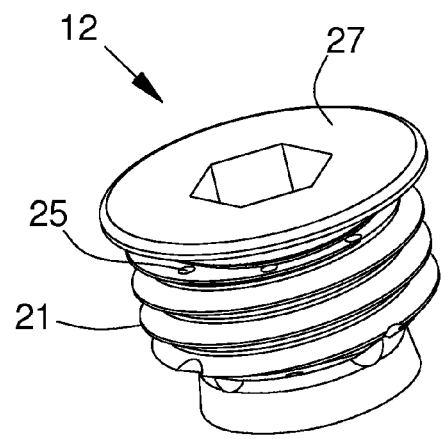
FIG. 12 is a diagrammatic perspective view of a further embodiment of a burst disk plug.

Turning to FIGS. 8 and 13 for illustration, embodiments of burst disk assembly 10 include a tortuous fluid flow path 48. This flow path traps fragments of a ruptured burst disk within burst disk plug 12 and distributes the fluid so that it does not represent a hazard as it exits burst disk plug 12.

According to the illustrated embodiments (as shown, for example, in FIGS. 6 and 13), when burst disk 14 ruptures, pressurized fluid flows through port 26 in burst disk retainer 16 and into central bore 36. Fragments of the ruptured burst disk may also enter central bore 36. If allowed to be projected out of burst disk assembly 10, such fragments would pose a serious safety risk. From central bore 36 the escaping fluid makes approximately a right turn into one or more generally radially extending bores, typical ones of which are depicted at 20, 30, and 32 (see FIG. 3), respectively.

Turning to FIGS. 6, 8 and 13 for illustration, central bore 36 together with these radially extending bores form a fluid receiving port that defines one or more tortuous fluid flow passages. From the generally radially extending bore(s) the escaping fluid turns and flows into distribution manifold 24 and at least one bleed channel, of which 18 and 25 are typical to their respective embodiments. Distribution manifold 24 extends generally annularly of burst disk plug 12 in communication with the respective generally radially extending bores, and the respective axially extending bleed channels. Distribution manifold 24 in this embodiment is in the form of a circumferential groove, and it acts as a manifold that serves to generally balance the flow of fluid between the respective bleed channels. If one or more of the generally radially extending bores becomes clogged with fragments of the ruptured burst disk, the presence of distribution manifold 24 generally causes the flow to remain approximately balanced between the respective bleed channels.

Fluid exits burst disk assembly 10 through the respective bleed channels, and is deflected from a generally axial direction of flow as it impinges on flange surface 28. Flange surface 28 extends generally radially so the pressurized fluid is exhausted in an approximately radial direction with respect to major axis 46. The torturous fluid flow path 48 prescribed by the structure of the embodiments chosen for purposes of illustration provides for the safe and effective venting of excess pressure from an associated pressurizable chamber 40.

In the further embodiments of FIGS. 7-12, bleed channels 25 serve to convey venting fluid to flange surface 28. Bleed channels 25 extend axially through the body of the plug without intersecting male thread 21. Bleed channels 25 extend through the body of the plug at locations spaced radially outwardly of the longitudinal axis of the burst disk plug 12 and open outwardly at a location such that fluid discharge through them impinges on flange surface 28. Major axis 46 is the longitudinal axis of the plug and in certain embodiments the approximately cylindrical threaded surface of the plug is generally concentric with major axis 46. Bleed channels 25 need not extend parallel to major axis 46. In certain embodiments safety is enhanced by locating the bleed channels so that the torturous fluid flow path 48 for escaping fluids must make at least two sharp turns before reaching flange surface 28. Such sharp turns tend to entrap or at least reduce the velocity of any disk fragments that may enter the flow path.

Both bleed channels 18 and 25 may be used in the same embodiment, if desired. In certain embodiments a bleed channel may extend interiorly of the threads for part of the axial length of the plug, and through the threads for the rest of the necessary distance. In certain embodiments more than one bleed channel 25 is employed. The provision of bleed channels 18 and 25 extending through the body of the plug from adjacent interior end 29 of burst disk plug 12 to adjacent exterior end 27 permits the potentially plug-weakening axial and cross-bores to be located adjacent to the interior end 29 of the burst disk plug 12. As a result, the location at which the head of burst disk plug 12 is attached to the portion including male thread 21 is not structurally weakened by cross- or axial bores.

According to certain embodiments, the presence of a plurality of bleed channels and flange surface 28 distributes the fluid as it leaves burst disk assembly 10 so that it does not focus thrust against burst disk plug 12 in a single direction. The resulting distribution of thrust prevents the container to which burst disk assembly 10 is mounted from becoming a missile. The multiple turns in torturous fluid flow path 48 tend to trap any fragments from a ruptured burst disk 14 before such fragments can be ejected from burst disk assembly 10.

In the embodiments chosen for illustration, burst disk plug 12 is provided with a hexagonal socket 22 in its head. Socket 22 is adapted to be engaged by a hexagonal wrench for purposes of installation and removal of the plug.

The bleed channels, of which 18 and 25 are typical, serve an additional safety function. Turning to FIG. 13 for illustration, when burst disk plug 12 is fully tightened into a threaded port, the radially extending face of burst disk retainer 16 in some embodiments bears against a surface in the mounting port and prevents fluid from escaping around burst disk retainer 16. If burst disk plug 12 is unscrewed from the mounting port in which it is mounted while there is pressurized fluid in an associated pressurizable chamber 44, the fluid will flow around burst disk retainer 16 and vent through bleed channels 18 and 25 before burst disk plug 12 can be unscrewed so far that it comes out of the associated threaded port and becomes a missile.

According to certain embodiments, the lip 38 at the interior end of the plug is relieved so that it does not present a sharp edge to the burst disk as it ruptures. This tends to minimize the fragmentation of the burst disk.

The foregoing detailed description of the invention is intended to be illustrative and is not intended to limit the scope of the invention. Changes and modifications are possible with respect to the embodiments detailed in the foregoing descriptions, and it is understood that the invention may be practiced otherwise than that specifically described herein and still be within the scope of the appended claims.

What is claimed is:

1. A burst disk assembly for use in a pressurized fluid system for venting pressurized fluid from the system in the event that the pressure of the fluid exceeds a predetermined amount, said burst disk assembly comprising:
   a burst disk plug having a major axis, an approximately cylindrical surface generally concentric with said major axis and having a male thread thereon, a bleed channel extending generally axially through said male thread, said burst disk plug having an interior end, and an exterior end;
   a burst disk rupturably retained at about said interior end; and
   a pressure venting system, said pressure venting system including a fluid receiving port in said burst disk plug, said fluid receiving port being in fluid receiving position with said burst disk and in fluid communication with said bleed channel, said bleed channel being open to an ambient environment.

2. A burst disk assembly as defined in claim 1 in which said fluid receiving port defines a tortuous fluid flow passage leading to said bleed channel.

3. A burst disk assembly as defined in claim 1 in which said fluid receiving port defines more than one tortuous fluid flow passage in fluid communication with more than one said bleed channel.

4. A burst disk assembly as defined in claim 1 in which said pressure venting system further includes a flange surface approximately adjacent said exterior end, and fluid defectively positioned adjacent said bleed channel.

5. A burst disk assembly as defined in claim 1 in which said pressure venting system further includes a distribution manifold, said distribution manifold extending generally circumferentially of said burst disk plug, said distribution manifold being in fluid communication between said fluid receiving port and said bleed channel.

6. A burst disk assembly as defined in claim 1 in which said fluid receiving port is relieved generally adjacent said burst disk.

7. A burst disk assembly as defined in claim 1 in which said bleed channel extends generally parallel to said major axis.

8. A burst disk assembly for use in a pressurized fluid system for venting pressurized fluid from the system in the event that the pressure of the fluid exceeds a predetermined amount, said burst disk assembly comprising:
   a burst disk plug having a major axis, a plurality of bleed channels, an interior end, and an exterior end;
   a burst disk rupturably retained at about said interior end; and
   a pressure venting system, said pressure venting system including a fluid receiving port in fluid receiving position with said burst disk, a distribution manifold, said fluid receiving port defining a tortuous fluid flow passage between said burst disk and said distribution manifold, said bleed channels extending between said distribution manifold and approximately said exterior end, spaced generally radially from said major axis, and open to an ambient environment adjacent a flange surface, said flange surface being positioned to deflect fluid emitted from said bleed channels generally away from a direction parallel with said major axis.

9. A burst disk assembly as defined in claim 8 in which said fluid receiving port includes a central bore and a plurality of generally radially extending bores in fluid communication between said central bore and said distribution manifold.

10. A burst disk assembly as defined in claim 8 in which said flange surface is approximately adjacent said exterior end and extends approximately radially of said major axis.

11. A burst disk assembly as defined in claim 8 in which said distribution manifold extends at least partially circumferentially of said burst disk plug, approximately adjacent said interior end.

12. A burst disk assembly as defined in claim 8 in which said distribution manifold extends circumferentially of said burst disk plug, approximately adjacent said interior end.

13. A burst disk assembly as defined in claim 8 in which said fluid receiving port is relieved at generally said interior end.

14. A burst disk assembly for use in a pressurized fluid system for venting pressurized fluid from the system in the event that the pressure of the fluid exceeds a predetermined amount, said burst disk assembly comprising:
    a burst disk plug having a major axis, an approximately cylindrical surface having a male thread thereon, one or more bleed channels spaced apart and extending generally axially through said male thread, an interior end, and an exterior end;
    a burst disk rupturably retained at about said interior end; and
    a pressure venting system, said pressure venting system including a fluid receiving port in fluid receiving position with said burst disk and including one or more generally radially extending bores, a distribution manifold and a flange surface, said distribution manifold extending generally annularly and circumferentially of said burst disk plug approximately between said interior end and said male thread, said flange surface being approximately adjacent said exterior end and extending generally radially from said approximately cylindrical surface, said generally radially extending bores being in fluid communication between said interior end and said distribution manifold, said distribution manifold being in fluid communication between said generally radially extending bores and said bleed channels, said bleed channels being open to an ambient environment adjacent said flange surface and said flange surface being fluid defectively mounted adjacent said bleed channels.

15. A burst disk assembly as defined in claim 14 in which said fluid receiving port includes a chamfer at generally said interior end.

16. A burst disk assembly as defined in claim 14 in which said fluid receiving port includes a fillet at generally said interior end.

17. A burst disk assembly as defined in claim 14 further comprising a burst disk retainer adapted to receivingly engage said burst disk plug at generally said interior end and retainingly secure said burst disk at approximately said interior end.

18. A burst disk assembly as defined in claim 17 in which said burst disk retainer includes a port, said port forming a fluid communication pathway between said burst disk and said pressurized fluid.

19. A burst disk assembly as defined in claim 14 in which said burst disk plug includes a socket at approximately said exterior end.

20. A burst disk assembly as defined in claim 19 in which said socket is a hexagonal socket.

\* \* \* \* \*